United States Patent
Miranda, Jr. et al.

[11] Patent Number: 6,097,239
[45] Date of Patent: Aug. 1, 2000

[54] DECOUPLED SWITCHED CURRENT TEMPERATURE CIRCUIT WITH COMPOUNDED $\Delta V_{BE}$

[75] Inventors: Evaldo Martino Miranda, Jr., San Jose, Calif.; Michael G. Tuthill; John Blake, both of Limerick, Ireland

[73] Assignee: Analog Devices, Inc., Norwood, Mass.

[21] Appl. No.: 09/247,835

[22] Filed: Feb. 10, 1999

[51] Int. Cl.[7] .................................................. H01L 35/00
[52] U.S. Cl. ........................................... 327/512; 374/178
[58] Field of Search ..................................... 327/512, 513, 327/378; 374/170, 178

[56] References Cited

U.S. PATENT DOCUMENTS

| | | | |
|---|---|---|---|
| 4,331,888 | 5/1982 | Yamauchi | 340/598 |
| 5,066,140 | 11/1991 | Beran | 374/134 |
| 5,195,827 | 3/1993 | Andy et al. | 374/172 |
| 5,213,416 | 5/1993 | Neely et al. | 374/178 |
| 5,982,221 | 11/1999 | Tuthill | 327/512 |

*Primary Examiner*—Kenneth B. Wells
*Attorney, Agent, or Firm*—Iandiorio & Teska

[57] ABSTRACT

A decoupled switched current temperature circuit with compounded $\Delta V_{be}$ includes an amplifier having an inverting input with corresponding non-inverting output and a non-inverting input with a corresponding inverting output; a PN junction connected to the non-inverting input through a first input capacitor and a voltage reference circuit is connected to the inverting input through a second input capacitor; a current supply includes a low current source and a high current source; a switching device applies the high current source to the PN junction and applies the low current source to the PN junction for providing the $\Delta V_{be}$ of the PN junction to the first capacitor; a first feedback capacitor is interconnected between the inverting output and the non-inverting input and a second feedback capacitor is interconnected between the non-inverting output and inverting input of the amplifier to define the gain on each of the inputs to produce a differential voltage across the outputs representative of the temperature of the PN junction; first and second reset switching devices discharge the first and second feedback capacitors, respectively, and a multi-phase switched device alternately interchanges the connection of the first and second input capacitors with the amplifier inputs for compounding the single $\Delta V_{be}$.

12 Claims, 5 Drawing Sheets

DECOUPLED SWITCHED CURRENT TEMPERATURE CIRCUIT WITH COMPOUNDED $\Delta V_{BE}$

FIELD OF INVENTION

This invention relates to a decoupled switched current temperature circuit with compounded $\Delta V_{be}$.

BACKGROUND OF INVENTION $V_{be}$, the base to emitter voltage of a PN junction, is complementary to absolute temperature (CTAT)

$$V_{be} = \frac{kT}{q} \ln \frac{I}{Is} \quad (1)$$

where K is a constant, T is absolute temperature, q is charge, I is the collector current and $I_s$ is the saturation current. $\Delta V_{be}$, the difference between the $V_{be}$'s of two PN junctions, is proportional to absolute temperature (PTAT)

$$\Delta V_{be} = \frac{kT}{q} \ln(N) \quad (2)$$

It is this relationship that underlies the use of PTAT cells to measure temperature. In one approach the cell uses two PN junctions of different areas ratioed by N and supplied with the same current to develop $\Delta V_{be}$ as shown by Paul Brokaw, "A Simple Three-Terminal IC Bandgap Reference", Solid-State Circuits, Vol. SC-9, pp. 388–393 (December 1974). This works well but the ratio of the areas must be carefully controlled to ensure accuracy. Increased $\Delta V_{be}$ can be obtained by increasing the ratio but doubling the $\Delta V_{be}$ requires squaring the ratio of the areas which increases the size of the cell and makes the precision of the ratio difficult to maintain. In another approach this problem with the ratioed areas is avoided by using but a single PN junction supplied with two different currents in a preselected ratio to obtain $\Delta V_{be}$. An improvement on these approaches disclosed in U.S. Pat. No. 5,982,221; Switched Current Temperature Sensor Circuit with Compounded $\Delta V_{be}$, of Michael G. Tuthill, filed uses two different currents and two identical PN junctions to obtain an improved, larger, 2 $\Delta V_{be}$ signal and further teaches alternately switching the $\Delta V_{be}$ inputs to a differential amplifier to accommodate ever larger signals of 4 $\Delta V_{be}$, 6 $\Delta V_{be}$, 8 $\Delta\Delta V_{be}$, and so on. All of these dual junction approaches suffer from the problem that the two PN junctions must be on the same chip as they produce a temperature value which is the average of the temperature of the two junctions. That is, they cannot be properly used to measure off-chip temperature.

SUMMARY OF INVENTION

It is therefore an object of this invention to provide a decoupled switched current temperature circuit with compounded $\Delta V_{be}$.

It is a further object of this invention to provide such a decoupled switched current temperature circuit with compounded $\Delta V_{be}$ in which either one or both of the temperature measuring elements may be remote from the signal processing portion of the circuit.

It is a further object of this invention to provide such a decoupled switched current temperature circuit with compounded $\Delta V_{be}$ in which the signal processing portion of the circuit is implemented in an integrated circuit chip.

It is a further object of this invention to provide such a decoupled switched current temperature circuit with compounded $\Delta V_{be}$ in which the temperature is measured by a single PN junction which can be located with or remote from the rest of the circuit.

The invention results from the realization that a more effective switched current temperature circuit with compounded $\Delta V_{be}$ in which one or both of the temperature sensing elements (including a PN junction and a reference voltage circuit) can be remote from the rest of the circuit is achieved by applying switched ratioed currents to a PN junction to develop a $\Delta V_{be}$ relative to the reference voltage circuit and selectively switching the PN junction and reference voltage circuit outputs between first and second input capacitors to an inverting amplifier.

This invention features a decoupled switch current temperature circuit with compounded $\Delta V_{be}$ including an amplifier having an inverting input with corresponding non-inverting output and a non-inverting input with a corresponding inverting output. There is a PN junction connected to the non-inverting input through a first capacitor and a voltage reference circuit connected to the inverting input through a second input capacitor. A current supply includes a low current source and a high current source. There is a switching device for applying in the high current source to the PN junction and for applying the low current source to the PN junction for providing the $\Delta V_{be}$ of the PN junction to the first capacitor. A first feedback capacitor is interconnected between the inverting output and non-inverting input and the second feedback capacitor is interconnected between the non-inverting output and inverting input of the amplifier to define the gain on each of the inputs to produce a differential voltage across the outputs representative of the temperature of the PN junction. There are first and second reset switching devices for discharging the first and second feedback capacitors, respectively. A multi-phase switch device alternately interchanges the connection of the first and second input capacitors with the amplifier inputs for compounding the single $\Delta v_{be}$.

In a preferred embodiment there may be a synchronizing circuit for synchronously operating the switching device and the multi-phase switch device for alternately interconnecting each capacitor to the PN junction and input and then to the voltage reference circuit and input. The PN junction may be a transistor and it may be a bipolar transistor. The amplifier, current supply, switching device, feedback capacitors, input capacitors, reset switching device and multi-phased switching device may be implemented on an integrated circuit chip. The PN junction may be on the integrated circuit chip. The voltage reference circuit may be on the integrated circuit chip. Both the PN junction and the voltage reference circuit may be on the integrated circuit chip. The PN junction may be remote from the integrated circuit chip. The voltage reference circuit may include a PN junction and a current source. The voltage reference circuit may provide a ground voltage reference. The PN junction may be a discrete transistor.

BRIEF DESCRIPTION OF THE DRAWINGS

Other objects, features and advantages will occur to those skilled in the art from the following description of a preferred embodiment and the accompanying drawings, in which.

DISCLOSURE OF PREFERRED EMBODIMENTS

Figure 1:
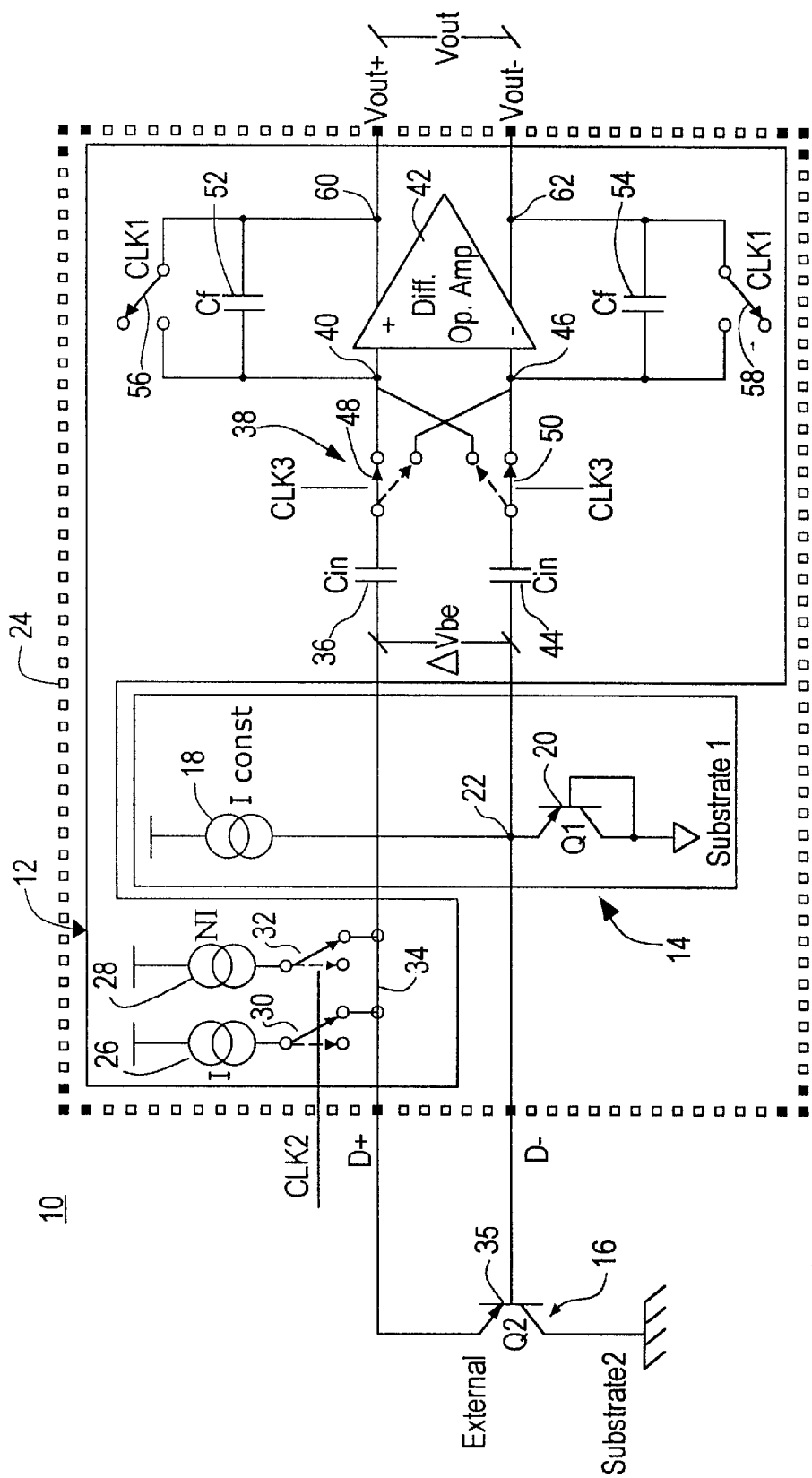
FIG. 1 is a schematic diagram of a decoupled switched current temperature circuit with compounded $\Delta V_{be}$ according to this invention with the PN junction remote from the integrated chip.

There is shown in FIG. 1a decoupled switched current temperature circuit with compounded $\Delta V_{be}$ 10 according to this invention which includes a signal processing circuit 12 and temperature sensing elements including a reference voltage circuit 14 and PN junction 16. In this particular embodiment voltage reference circuit 14 actually includes a current source 18 providing $I_{constant}$ and a PN junction 20 at whose emitter output, terminal 22, the reference voltage appears. The voltage reference circuit 14 is not limited to such a device as any voltage reference circuit would do. The voltage reference at terminal 22 may be any desired voltage including ground. The PN junction 16 is decoupled from the voltage reference circuit 14 and the rest of the signal processing circuit 12. By decoupled is meant that it is not necessary for it to be a matched transistor on the same integrated circuit chip; it may be a different component entirely and be entirely remote from the voltage reference circuit 14 and the signal processing circuit 12.

In FIG. 1 signal processing circuit 12 and voltage reference circuit 14 are shown as formed on a single integrated circuit chip 24. Signal processing circuit 12 includes a pair of current sources 26 and 28 which provide a current I and a ratioed current greater than I by a factor N, or NI. These two currents, I and NI, from current sources 26 and 28 are selectively applied by switches 30 and 32, under control of clock signal CLK2 through line 34 to the emitter 35 of PN junction 16 which is connected through input capacitor 36 and switch 38 in its current position to the positive input 40 of differential operational amplifier 42. The reference voltage supplied by circuit 14 appearing at terminal 22 is applied through input capacitor 44 to switch 38 in its current position to the negative input 46 of op amp 42. Capacitor 36 is connected to arm 48 of switch 38 while capacitor 44 is connected through arm 50 of switch 38 to op amp 42. Under control of clock signal CLK3, switch arms 48 and 50 move from their present position to the dashed line position whereby the outputs of capacitor 36 and 44 are interchanged with inputs 40 and 46 of op amp 42. Op amp 42 also has associated with it a pair of feedback capacitors 52 and 54 each of which has associated with it a zeroing switch 56 and 58 which operates under a third clock signal CLK1. Differential op amp 42 operates in the normal way so that the positive signal at its input 40 will produce a negative signal at its output 60 and a negative signal at its input 46 will provide a positive signal at its output 62.

In operation, the entire circuit 10 is operated synchronously by clock 64 that provides clock signals CLK1, CLK2 and CLK3. At the occurrence of clock signal CLK1, 70, FIG. 2, switches 56 and 58 are closed to discharge capacitors 52. After that, clock signal 70 transitions at 72 and remains off as shown at 74 so that switches 56 and 58 remain open for the duration of this cycle of operation. This sequence is more fully described in the auto-zero mode as described U.S. Pat. No. 5,982,221. Following this the clock pulse 76 of clock signal CLK2 76 operates switches 30 and 32 which move from the full line position shown in FIG. 1 to the crossed position, shown in dashed line. Thus the current through PN junction 16 decreases from NI to I. This produces a change of minus $\Delta V_{be}$ between the emitter 35 of PN junction 16 and the voltage reference terminal 22. This minus $\Delta V_{be}$ voltage change appears also across the inputs of capacitors 36 and 44 and provides a charge transfer through the switch arms 48 and 50 and their respective capacitors 52 and 54. Since the capacitors 36 and 44 are equal and since the differential op amp 42 drives to maintain the same voltage on its inputs 40 and 46, the voltage change across 36 and 44 splits equally so that each sees one half of the total $-\Delta V_{be}$ voltage change, or $-\Delta V_{be}/2$. This causes the input common mode voltage to drop by $-\Delta V_{be}/2$.

Subsequently, when the first clock pulse 80 of clock pulse signal CLK3 82 occurs, switch 38 operates interchanging the position of its arms 48 and 50 and thereby interchanging the outputs from capacitors 36 and 44 with the inputs 40 and 46 of op amp 42. Now clock pulse CLK1 remains low but when CLK2 pulse 84 occurs, switches 30 and 32 swing back to the position shown in FIG. 1 and the voltage on PN junction 16 rises so that the voltage from its emitter to the voltage reference terminal 22 changes by $+\Delta V_{be}$. Since the switch 38 has interchanged the outputs of capacitors 36 and 44 with respect to the inputs 40, 46 of op amp 42, those capacitors 36 and 44 now provide their charge to the opposite feedback capacitors, namely 54 and 52, respectively, and now the voltage change across each of those input capacitors 36 and 44 is $+\Delta V_{be}/2$ and the common mode voltage has changed back by $+\Delta V_{be}/2$.

Figure 2:
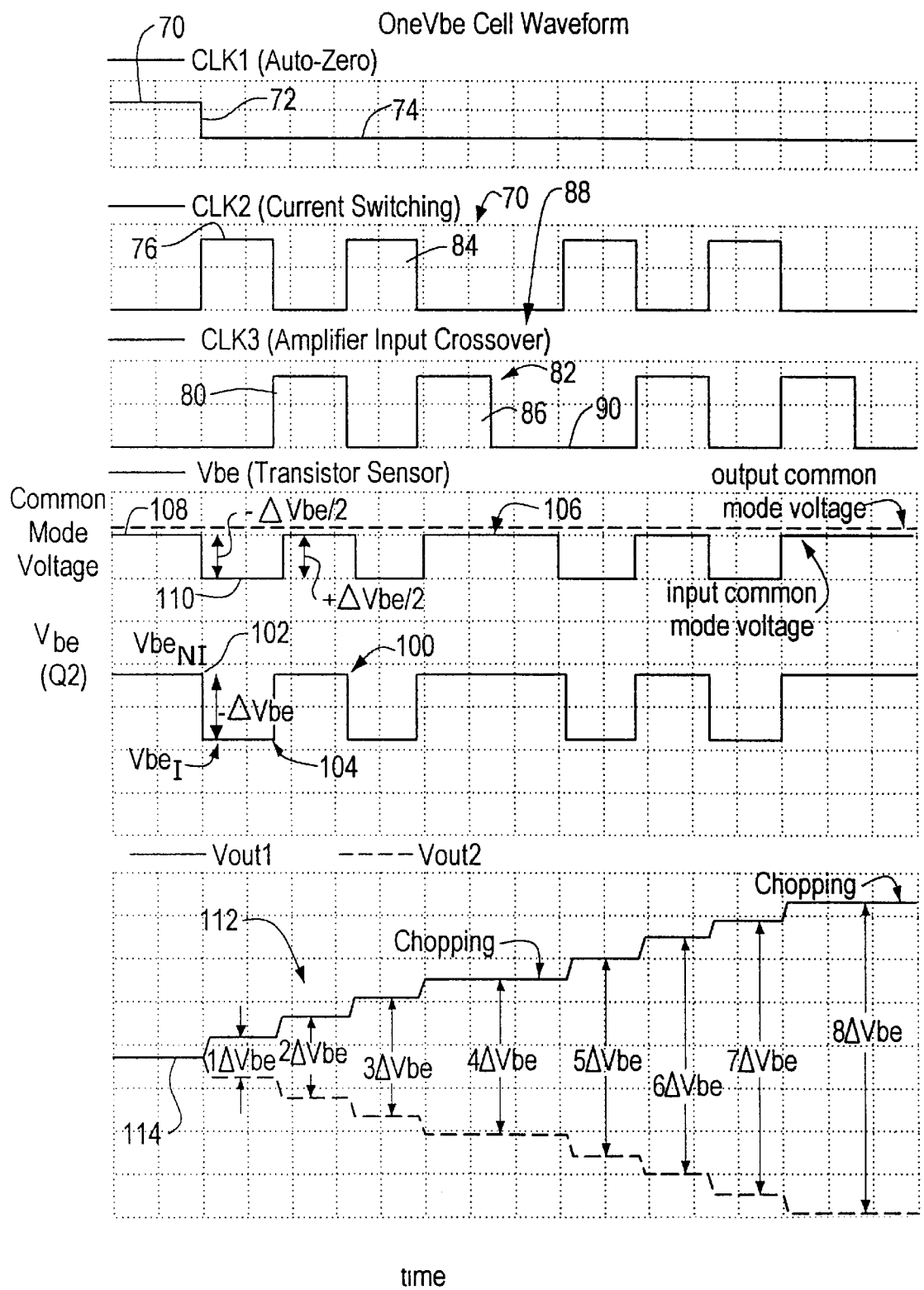
FIG. 2 illustrates the waveforms that occur in the circuits of FIG. 1.

This cycle continues with the occurrence of the clock pulse CLK3 86, FIG. 2, which switches arms 48 and 50 back to their original position. After two such sets of clock pulses CLK2 and CLK3 there is a transition from 86 to 90 during which only chopping occurs: chopping is the internal swapping of the inputs of differential op amp 42 in order to cancel any amplifier offset voltages, and occurs at every transition of CLK3. When chopping is done every time the switch 38 changes its position, it cancels the effect of amplifier offset. The generation of the voltage changes by $-\Delta V_{be}$ and $+\Delta V_{be}$ can be seen from the waveform 100, FIG. 2, which moves from a high of $V_{beNI}$ to a low of $V_{beI}$ and back again to create $-\Delta V_{be}$ and $+\Delta V_{be}$ values. The associated transition of input common mode voltage 106 can also be seen in FIG. 2 where it moves from 108 by $-\Delta V_{be}/2$ at 110 and back again by $+\Delta V_{be}/2$. By synchronizing the operation of switch devices 30, 32 and the multi-phase switch 38, a stacking or accumulation of the individual $V_{be}$'s can be achieved so any number of multiples of $\Delta V_{be}$ can be accumulated to increase the size of the $\Delta V_{be}$ signal and thereby improve its accuracy in measuring temperature. This is shown in FIG. 2 where the waveform 112 represents the output voltage of amplifier 42. Waveform 112 also shows the auto zero mode 114 followed by the accumulation steps which provide $\Delta V_{be}$, 2 $\Delta V_{be}$, 3 $\Delta V_{be}$, 4 $\Delta V_{be}$, followed by a single chopping after which the sequence begins again, to bring the total to 8 $\Delta V$, assuming capacitor $C_{in}=C_F$. Note that one may choose to ratio $C_{in}=$ 2CF and only use one set of 4 cycles and achieve the same 8 $\Delta V_{be}$ result as shown before.

$$V_{out}=m[\Delta V_{be} \cdot C_{in}/C_F] \quad (3)$$

where m is an integer number.

Figure 3:
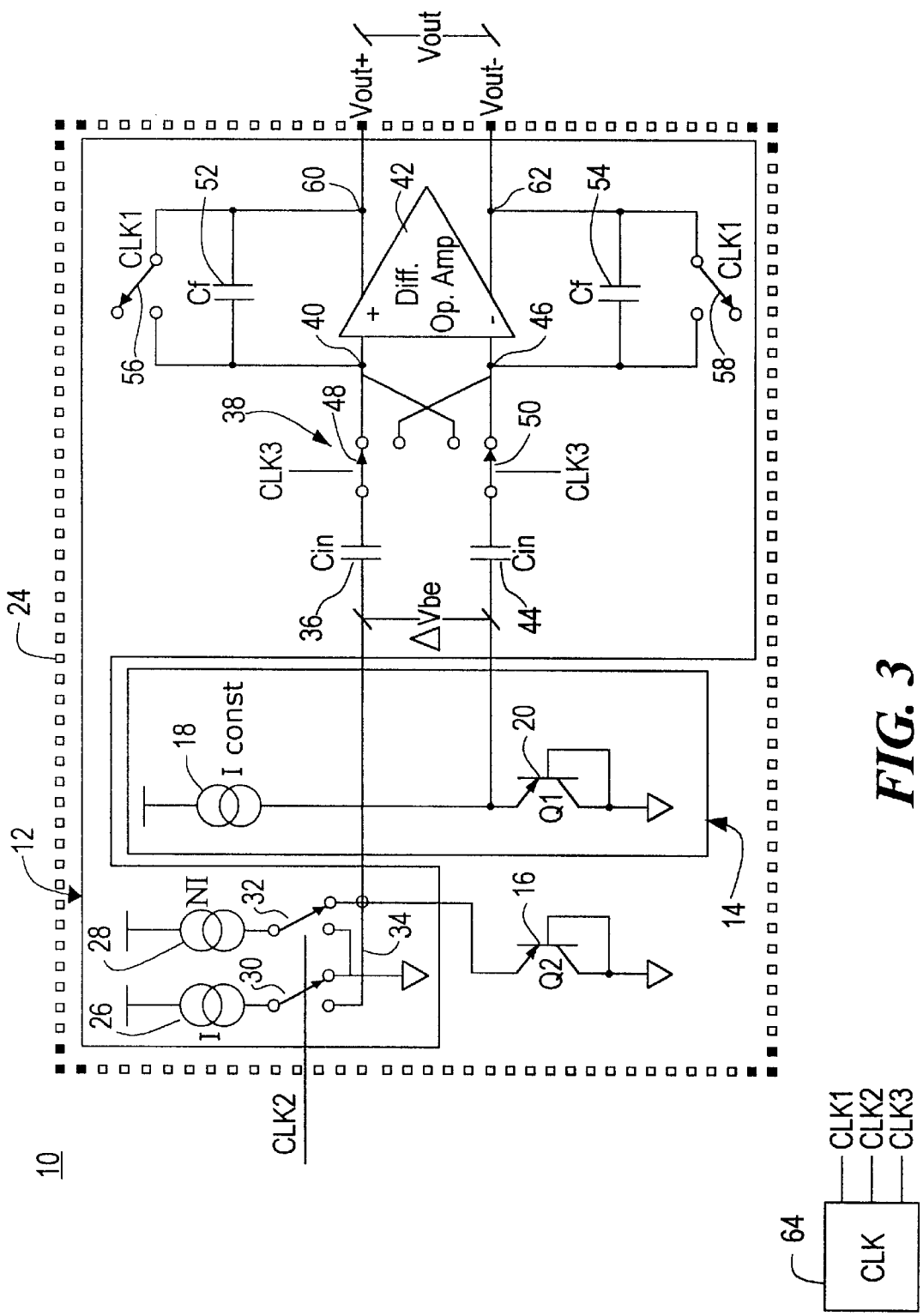
FIG. 3 is a schematic diagram similar to FIG. 1 of an alternative construction of the decoupled switched current temperature circuit with compounded $V_{be}$ according to this invention with the PN junction and voltage reference circuit on the integrated chip.

Although in FIG. 1 the decoupled PN junction 16 and voltage reference circuit 14 are shown separated with the PN junction 16 remote from integrated circuit chip 24, this is not a necessary limitation of the invention. For example, as shown in FIG. 3, PN junction 16 may be placed on the same chip with the PN junction 20 and current source 18 or whatever is used to constitute the voltage reference circuit 14. Moreover, PN junctions 16 and 20 may both be off-chip.

Figure 4:
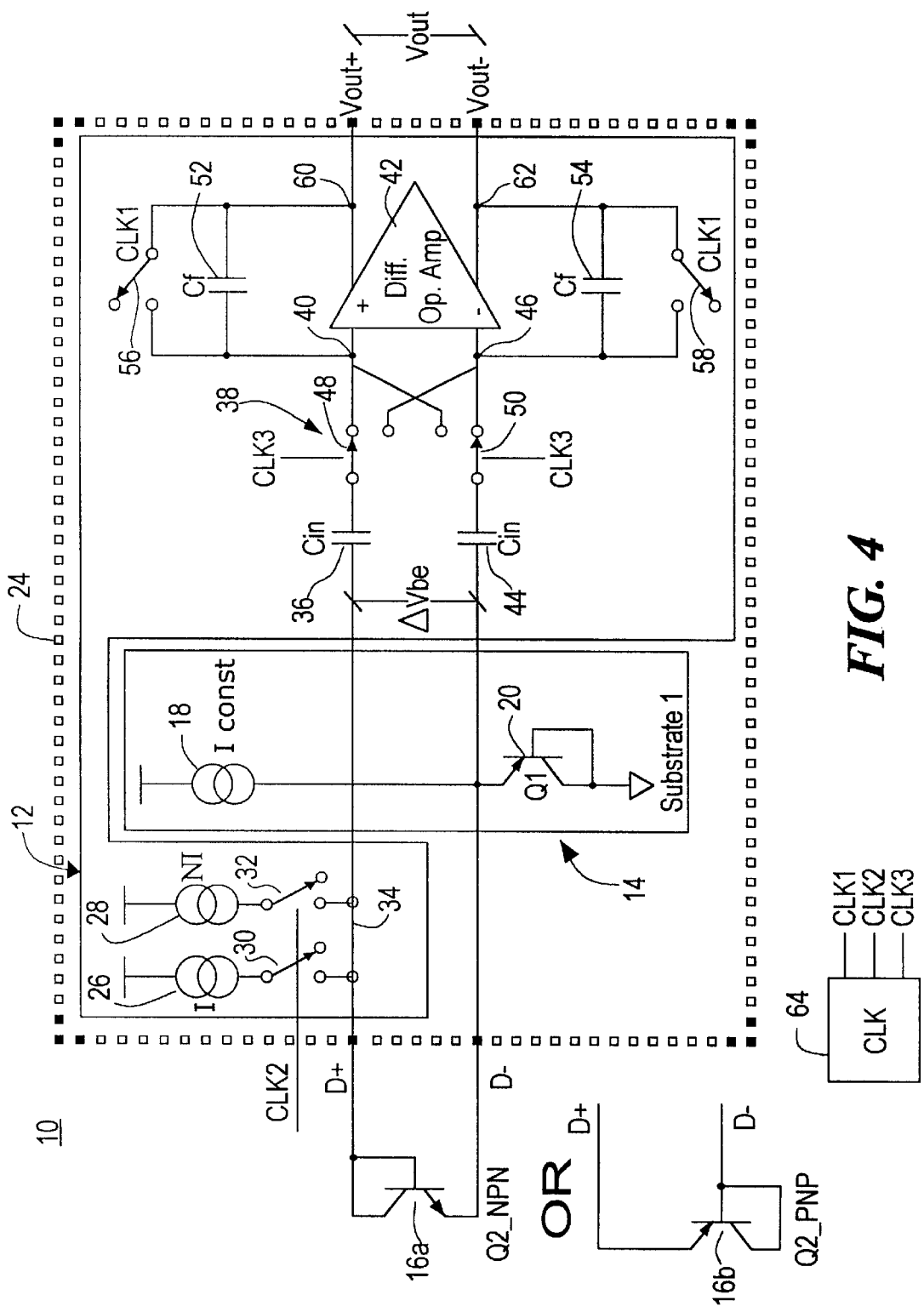
FIG. 4 is another schematic diagram similar to FIG. 1 of another construction of the decoupled switched current temperature circuit with compounded $V_{be}$ according to this invention with the remote PN junction implemented as a discrete transistor.

PN junction 16 may be implemented as a discrete transistor 16a, FIG. 4, shown as an NPN, or may be a PNP as shown at 16b.

Figure 5:
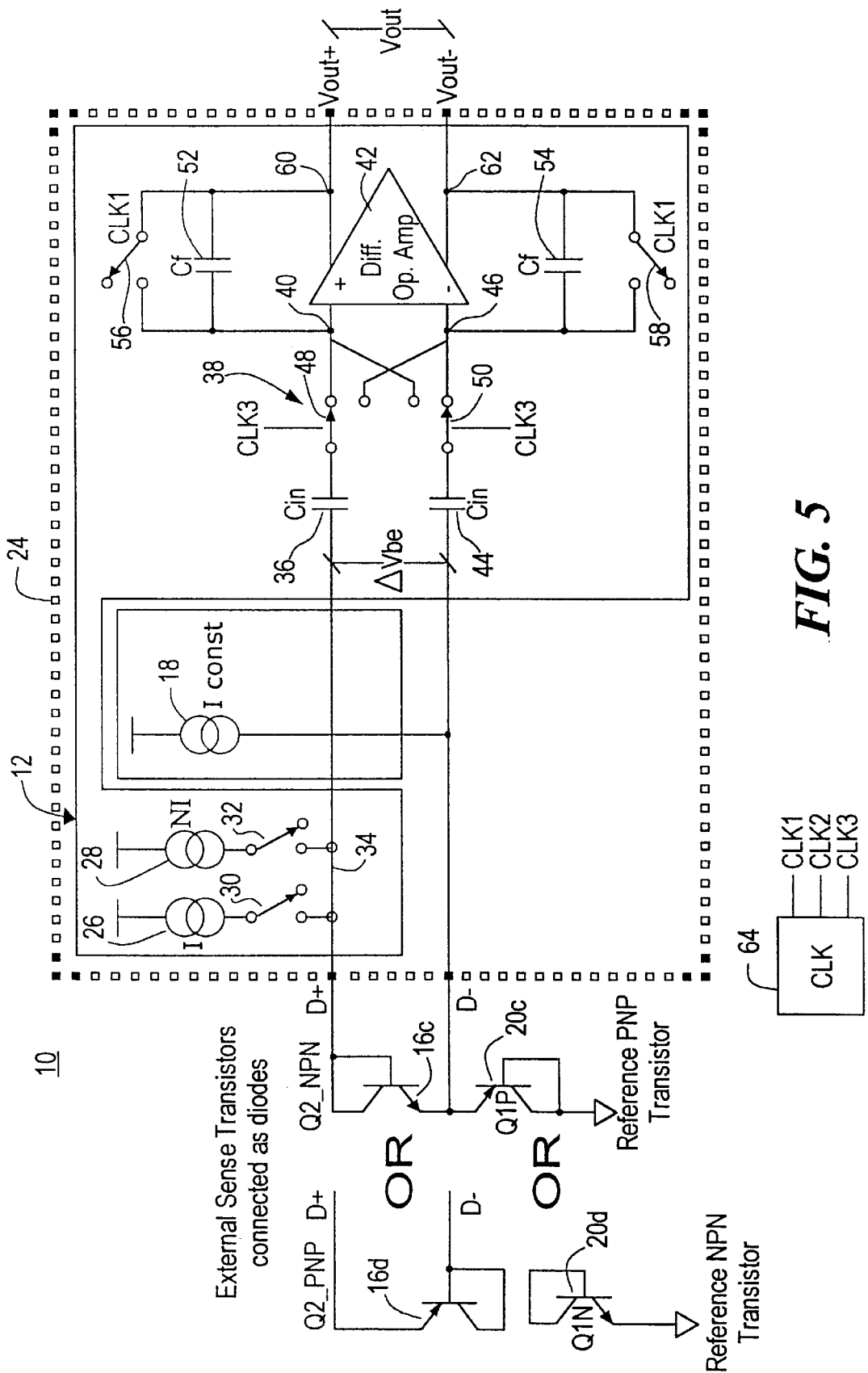
FIG. 5 is a schematic diagram similar to FIG. 1 of yet another alternative construction of the decoupled switched current temperature circuit with compounded $V_{be}$ according to this invention with both the PN junction and voltage reference circuit remote from the integrated circuit chip.

The PN junction 16c and the junction 20c, FIG. 5, may be disposed remote from integrated circuit 24 and may both be discrete transistors; the junction transistor may be an NPN transistor while the reference transistor 20c may be a PNP transistor. Or alternatively, as shown at 16d and 20d, the junction transistor may be a PNP and the reference transistor an NPN.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A decoupled switched current temperature circuit with compounded $\Delta V_{be}$ comprising:

an amplifier having an inverting input with corresponding non- inverting output and a non-inverting input with a corresponding inverting output;

a PN junction connected to said non-inverting input through a first input capacitor and a voltage reference circuit connected to said inverting input through a second input capacitor;

a current supply including a low current source and a high current source;

a switching device for applying the high current source to said PN junction and for applying the low current source to said PN junction for providing the $\Delta V_{be}$ of the said PN junction to said first capacitor;

a first feedback capacitor interconnected between the inverting output and non-inverting input and a second feedback capacitor interconnected between the non-inverting output and inverting input of said amplifier to define the gain on each of the inputs to produce a differential voltage across the outputs representative of the temperature of said PN junction;

first and second reset switching devices for discharging said first and second feedback capacitors, respectively; and a multi-phase switched device for alternately interchanging the connection of said first and second input capacitors with said amplifier inputs for compounding the single $\Delta V_{be}$.

2. The decoupled switched current temperature circuit with compounded $\Delta V_{be}$ of claim 1 further including a synchronizing circuit for synchronously operating said switching device and said multiphase switch device for alternately interconnecting each said capacitor to said PN junction and input and then to the voltage reference circuit and input.

3. The decoupled switched current temperature circuit with compounded $\Delta V_{be}$ of claim 1 in which said PN junction is a transistor.

4. The decoupled switched current temperature circuit with compounded $\Delta V_{be}$ of claim 1 in which said PN junction is a bipolar transistor.

5. The decoupled switched current temperature circuit with compounded $\Delta V_{be}$ of claim 1 in which said amplifier, current supply, switching device, feedback capacitors, input capacitors, reset switching devices and multi-phase switched device are implemented on an integrated current chip.

6. The decoupled switched current temperature circuit with compounded $\Delta V_{be}$ of claim 5 in which said PN junction is on said integrated circuit chip.

7. The decoupled switched current temperature circuit with compounded $\Delta V_{be}$ of claim 5 in which said voltage reference circuit is on said integrated circuit chip.

8. The decoupled switched current temperature circuit with compounded $\Delta V_{be}$ of claim 5 in which said PN junction and said voltage reference circuit are on said integrated circuit chip.

9. The decoupled switched current temperature circuit with compounded $\Delta V_{be}$ of claim 5 in which said PN junction is remote from said integrated circuit chip.

10. The decoupled switched current temperature circuit with compounded $\Delta V_{be}$ of claim 1 in which said voltage reference circuit includes a PN junction and a current source.

11. The decoupled switched current temperature circuit with compounded $\Delta V_{be}$ of claim 1 in which said voltage reference current provides a ground voltage reference.

12. The decoupled switched current temperature circuit with compounded $\Delta V_{be}$ of claim 1 in which said PN junction is a discrete transistor.

* * * * *

UNITED STATES PATENT AND TRADEMARK OFFICE
CERTIFICATE OF CORRECTION

PATENT NO.   : 6,097,239
DATED        : August 1, 2000
INVENTOR(S)  : Miranda Jr. et al.

It is certified that error appears in the above-identified patent and that said Letters Patent is hereby corrected as shown below:

Title page,
One of the inventor's names is incorrectly listed as "Evaldo Martino Miranda, Jr.". The correct inventor's name should read Evaldo Martins Miranda, Jr.

Signed and Sealed this

First Day of January, 2002

*Attest:*

*Attesting Officer*

JAMES E. ROGAN
*Director of the United States Patent and Trademark Office*